United States Patent [19]

Schläfer et al.

[11] 4,072,463
[45] Feb. 7, 1978

[54] LIQUID PREPARATIONS OF REACTIVE DYESTUFFS

[75] Inventors: Ludwig Schläfer, Fischbach, Taunus; Konrad Opitz, Liederbach, Taunus, both of Germany

[73] Assignee: Hoechst Aktiengesellschaft, Frankfurt am Main, Germany

[21] Appl. No.: 565,737

[22] Filed: Apr. 7, 1975

[30] Foreign Application Priority Data

Apr. 9, 1974 Germany .................. 2417255

[51] Int. Cl.² ............... C09B 31/00; D06P 1/38; C09B 33/00
[52] U.S. Cl. .................... 8/41 B; 8/1 D; 8/41 R; 8/171
[58] Field of Search ............ 8/41 R, 41 A, 41 B, 8/41 C, 1 E

[56] References Cited

U.S. PATENT DOCUMENTS

| | | | |
|---|---|---|---|
| 3,097,040 | 7/1963 | Casty | 8/54 |
| 3,129,053 | 4/1964 | Castle | 8/93 |
| 3,346,322 | 10/1967 | Finkenauer | 8/79 |
| 3,637,645 | 1/1972 | Meininger | 260/147 |
| 3,649,615 | 3/1972 | Ikeda | 260/199 |
| 3,697,500 | 10/1972 | Ackermann | 260/154 |
| 3,802,837 | 4/1974 | Bohnert | 8/41 R |
| 3,887,329 | 6/1975 | Hegar | 8/171 |
| 3,963,418 | 6/1976 | Tullio | 8/41 B |
| 3,963,430 | 6/1976 | Nonn | 8/39 R |

FOREIGN PATENT DOCUMENTS 890,753  3/1972  United Kingdom ............ 8/1 E

*Primary Examiner*—Christopher A. Henderson
*Attorney, Agent, or Firm*—Curtis, Morris & Safford

[57] ABSTRACT

The present invention provides liquid aqueous dyeing preparations of reactive dyestuffs which in the form of their free acid correspond to the formula (I)

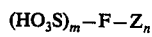

(I), wherein F represents the radical of a dyestuff chromophore of an anthraquinone, a mono-, dis- or tris-azo dyestuff, or of a phthalocyanine dyestuff, the phthalocyanine dyestuffs as well as the azo dyestuffs possibly being present as complex metal compounds with Cu, Cr, Co, Ni or Fe as the complex-forming central atom, $m$ represents an integer being 2 or above, for example an integer in the range of from 2 to 8, and $n$ is an integer in the range of from 1 to 3, and Z stands for a fiber-reactive group, said dyeing preparations being suitable for the dyeing and printing of fiber materials on the basis of wool, silk, polyamide and natural or regenerated cellulose, according to the process which is common for reactive dyestuffs.

7 Claims, No Drawings

LIQUID PREPARATIONS OF REACTIVE DYESTUFFS

The present invention relates to liquid preparations of reactive dyestuffs.

The present invention provides liquid aqueous dyeing preparations of reactive dyestuffs which in the form of their free acid correspond to the formula (I)

$$(HO_3S)_m\text{—}F\text{—}Z_n \qquad (I),$$

wherein F represents the radical of a dyestuff chromophore of an anthraquinone, a mono-, dis- or tris-azo dyestuff, or of a phthalocyanine dyestuff, the phthalocyanine dyestuffs as well as the azo dyestuffs possibly being present as complex metal compounds with Cu, Cr, Co, Ni or Fe as the complex-forming central atom, $m$ represents an integer being 2 or above, for example an integer in the range of from 2 to 8, and $n$ is an integer in the range of from 1 to 3, and Z stands for a fiber-reactive group.

These dyeing preparations contain one or several of these dyestuffs of formula (I), preferably in the form of an alkali metal salt, particularly sodium salt, in an aqueous solution in a concentration of from 5 to 35% by weight, preferably from 15 to 30% by weight, calculated on the pure dyestuff of the formula (I) and have a pH value in the range of from 3 to 7, preferably from 5.5 to 6.8, and they also contain from 1 to 5% by weight of buffer substances.

Dyestuffs corresponding to the formula (I) which are suitable for these liquid dyeing preparations have been known, for example, from:

German Offenlegungsschriften Nos. 1.544.517, 1.544.583, 1.544.541, 1.544.542, 1.619.491, 1.769.091, 2.049.664, German Auslegeschriften Nos. 1.101.657, 1.109.807, 1.156.914, 1.230.152, 1.232.294, 1.262.475, 1.289.929, 1.219.155, 1.544.500, German Patent Specifications Nos. 960.534, 960.484, 1.019.025, 1.045.575, 1.062.367, 1.101.657, 1.103.483, 1.088.633, 1.058.177, 1.152.493, 1.192.761, 1.126.542, 1.236.107, 1.299.213, 1.246.906, 1.289.207, 1.289.211, 1.248.188, 1.278.041, 1.289.206, 1.268.759, 1.289.930, 1.283.989, Belgian Patent Specification Nos. 578.517, 598.831, 740.710, French Patent Specifications Nos. 906.128, 1.200.700 and 1.212.810, and British Patent Specifications Nos. 775.308, 784.221, 781.930, 826.405, 838.307, 838.335, 803,473, 869.278, 838.340, 838.341, 838.342, 838.343, 838.344, 838.345, 844.869 and 1.134.947.

By reactive groups Z there are to be understood those groups which show one or several reactive groups or separable substituents, which are able to react, when the dyestuffs are applied onto cellulose materials, in the presence of acid-binding agents and, optionally, under the action of heat, with the hydroxyl groups of the cellulose, or which — if they are applied into superpolyamide fibers, such as wool — react with the NH groups of these fibers, while forming covalent bonds. Such fiber-reactive groups have been known in a great number from literature. Reactive groups containing at least one separable substituent bound to a heterocyclic or aliphatic radical are, among others, those groups which contain at least one reactive substituent bound to a 5- or 6- membered heterocyclic ring, such as a monazine, diazine or triazine ring, for example, a pyridine, pyrimidine, pyridazine, pyrazine, thiazine, oxazine, or an asymmetrical or symmetrical triazine ring, or to a ring system of this kind, which has one or several aromatic rings fixed by condensation, such as a quinoline, phthalazine, cinnoline, quinazoline, quinoxaline, acridine, phenazine and phenanthridine ring system; thus, the 5- or 6-membered heterocyclic rings showing at least one reactive substituent are preferably those which contain one or several nitrogen atoms and which may contain 5- or preferably 6-membered carbocyclic rings fixed by condensation. Of the reactive substituents at the heterocycle, there are to be mentioned, for example, halogen (Cl, Br or F), ammonium, including hydrazinium, sulfonium, sulfonyl, azido-($N_3$), rhodanido, thio, thioether, oxyether, sulfinic acid and sulfonic acid. There are to be mentioned specifically, for example, mono- or dihalogenosymmetrical triazinyl radicals, for example 2,4-dichlorotriazinyl-6-, 2-amino-4-chlorotriazinyl-6-, 2-alkylamino-4-chlorotriazinyl-6-, such as 2-methylamino-4-chlorotriazinyl-6-, 2-ethylamino- or 2-propylamino-4-chlorotriazinyl-1-6-, 2-β-oxethylamino-4-chlorotriazinyl-6-, 2-di-β-oxethylamino-4-chlorotriazinyl-6- and the corresponding sulfuric acid semi-esters, 2-diethylamino-4-chlorotriazinyl-6-, 2-morpholino- or 2-piperidino-4-chlorotriazinyl-6-, 2-cyclohexylamino-4-chlorotriazinyl-6-, 2-arylamino- and substituted arylamino-4-chlorotriazinyl-6-, such as 2-phenylamino-4-chlorotriazinyl-6-, 2-(o-, m- or p-carboxy- or sulfophenyl)-amino-4-chlorotriazinyl-6-, 2-alkoxy-4-chlorotriazinyl-6-, such as 2-methoxy- or ethoxy-4-chlorotriazinyl-6-, 2-(phenylsulfonylmethoxy)-4-chlorotriazinyl-6-, 2-aryloxy- and substituted aryloxy-4-chlorotriazinyl-6-, such as 2-phenoxy-4-chlorotriazinyl-6-, 2-(p-sulfophenyl)-oxy-4-chlorotriazinyl-6-, 2-(o-, m- or p-methyl- or methoxyphenyl)-oxy-4-chlorotriazinyl-6-, 2-alkylmercapto- or 2-arylmercapto- or 2-(substituted aryl)-mercapto-4-chlorotriazinyl-6-, such as 2-(β-hydroxyethyl)-mercapto-4-chlorotriazinyl-6-, 2-phenylmercapto-4-chlorotriazinyl-6, 2-(4'-methylphenyl)-mercapto-4-chlorotriazinyl-6-, 2-(2',4'-dinitro)-phenylmercapto-4-chlorotriazinyl-6-, 2-methyl-4-chlorotriazinyl-6-, 2-phenyl-4-chlorotriazinyl-6-, mono-, di- or trihalogeno-pyrimidinyl radicals, such as 2,4-dichloropyrimidinyl-6-, 2,4,5-trichloropyrimidinyl-6-, 2,4-dichloro-5-nitro- or -5-methyl- or 5-carboxymethyl- or -5-carboxy- or -5-cyano- or -5-vinyl- or -5-sulfo- or -5-mono-, -di- or trichloromethyl- or -5-carbo-alkoxy-pyrimidinyl-6-, 2,6-dichloro-pyrimidine-4-carbonyl-, 2,4-dichloropyrimidine-5-carbonyl-, 2-chloro-4-methylpyrimidine-5-carbonyl-, 2-methyl-4-chloro-pyrimidine-5-carbonyl-, 2-methylthio-4-fluoropyrimidine-5-carbonyl-, 6-methyl-2,4-dichloropyrimidine-5-carbonyl-, 2,4,6-trichloropyrimidine-5-carbonyl-, 2,4-dichloropyrimidine-5-sulfonyl-, 2-chloroquinoxaline-3-carbonyl-, 2- or 3-monochloroquinoxaline-6-carbonyl-, 2- or 3-monochloroquinoxaline-6-sulfonyl-, 2,3-dichloroquinoxaline-6-carbonyl-, 2,3-dichloroquinoxaline-6-carbonyl-, 2,3-dichloroquinoxaline-6-sulfonyl-, 1,4-dichlorophthalazine-6-sulfonyl- or -6-carbonyl-, 2,4-dichloroquinazoline-7- or -6-sulfonyl- or -cabonyl-, 2- or 3- or 4-(4',5'-dichloropyridazone-6'-yl-1')-phenylsulfonyl- or -carbonyl-, β-(4',5'-dichloropyridazone-6'-yl-1')-ethylcarbonyl-, N-methyl-N-(2,4-dichlorotriazinyl-6-carbamyl-, N-methyl-N-(2-methylamino-4-chlorotriazinyl-6)-carbamyl-, N-methyl-n-(2-dimethylamino-4-chlorotriazinyl-6)-carbamyl-, N-methyl- or N-ethyl-N-(2,4-dichlorotriazinyl-6)-aminoacetyl-, N-methyl-N-(2,3-dichloroquinoxaline-6-sulfonyl)-aminoacetyl-, N-methyl-N-(2,3-dichloroquinoxaline-6-carbonyl)-aminoacetyl-, as well as the corresponding bromo- and fluoro-derivatives of the above-mentioned chlorine-substituted heterocyclic radicals, among these for example, 2-fluoro-4-pyrimidinyl-, 2,6-difluoro-4-pyrimidinyl-, 2,6-difluoro-5-chloro-4-pyrimidinyl, 2-fluoro-5,6-dichloro-4-pyrimidinyl-, 2,6-difluoro-5-methyl-4-pyrimidinyl-, 2,5-difluoro-6-methyl-4-pyrimidinyl-, 2-fluoro-5-methyl-6-chloro-4-pyrimidinyl, 2-fluoro-5-nitro-6-chloro-4-pyrimidinyl, 5-bromo-2-fluoro-4-pyrimidinyl, 2-fluoro-5-cyano-4-pyrimidinyl, 2-fluoro-5-methyl-4-pyrimidinyl, 2,5,6-trifluoro-4-pyrimidinyl, 5-chloro-6-chloromethyl-2-fluoro-4-pyrimidinyl, 2,6-difluoro-5-bromo-4-pyrimidinyl, 2-fluoro-5-bromo-6-methyl-4-pyrimidinyl, 2-fluoro-5-bromo-6-chloromethyl-4-pyrimidinyl, 2,6-difluoro-5-chloro-methyl-4-pyrimidinyl, 2,6-difluoro-5-nitro-4-pyrimidinyl, 2-fluoro-6-methyl-4-pyrimidinyl, 2-fluoro-5-chloro-6-methyl-4-pyrimidinyl, 2-fluoro-5-chloro-4-pyrimidinyl, 2-fluoro-6-chloro-4-pyrimidinyl, 6-trifluoromethyl-5-chloro-2-fluoro-4-pyrimidinyl, 6-trifluoromethyl-2-fluoro-4-pyrimidinyl, 2-fluoro-5-nitro-4-pyrimidinyl, 2-fluoro-5-trifluoromethyl-4-pyrimidinyl, 2-fluoro-5-phenyl- or -5-methylsulfonyl-4-pyrimidinyl, 2-fluoro-5-carbonamido-4-pyrimidinyl, 2-fluoro-5-carbomethoxy-4-pyrimidinyl, 2-fluoro-5-bromo-6-trifluoromethyl-4-pyrimidinyl, 2-fluoro-6-carbonamido-4-pyrimidinyl, 2-fluoro-6-carbomethoxy-4-pyrimidinyl, 2-fluoro-6-phenyl-pyrimidinyl, 2-fluoro-6-cyano-4-pyrimidinyl, 2,6-difluoro-5-methylsulfonyl-4-pyrimidinyl, 2-fluoro-5-sulfonamido-4-pyrimidinyl, 2-fluoro-5-chloro-6-carbomethoxy-4-pyrimidinyl, 2,6-difluoro-5-trifluoromethyl-4-pyrimidinyl; triazine radicals containing sulfonyl groups, such as 2,4-bis-(phenylsulfonyl)-triazinyl-6-, 2-(3'-carboxyphenyl)-sulfonyl-4-chlorotriazinyl- o-, 2-(3'-sulfophenyl)-sulfonyl-4-chlorotriazinyl-6-, 2,4-bis-(3'-carboxy-phenylsulfonyl-1')-triazinyl-6-; pyrimidine rings containing sulfonyl groups, such as 2-carboxymethylsulfonyl-pyrimidinyl-4-, 2-methylsulfonyl-6-methylpyrimidinyl-4-, 2-methyl-sulfonyl-6-ethyl-pyrimidinyl-4-, 2-phenylsulfonyl-5-chloro-6-methyl-pyrimidinyl-4-, 2,6-bis-methyl-sulfonyl-pyrimidinyl-4-, 2,6-bis-methyl-sulfonyl-5-chloro-pyrimidinyl-4-, 2,4-bis-methylsulfonyl-pyrimidine-5-sulfonyl, 2-methylsulfonyl-pyrimidinyl-4-, 2-phenyl-sulfonylpyrimidinyl-4-, 2-trichloromethylsulfonyl-6-methyl-pyrimidinyl-4-, 2-methylsulfonyl-5-chloro-6-methyl-pyrimidinyl-4-, 2-methylsulfonyl-5-bromo-6-methyl-pyrimidinyl-4-, 2-methylsulfonyl-5-chloro-6-ethyl-pyrimidinyl-4-, 2-methylsulfonyl-5-chloro-6-chloromethyl-pyrimidinyl-4-, 2-methylsulfonyl-4-chloro-6-methyl-pyrimidine-5-sulfonyl-, 2-methyl-sulfonyl-5-nitro-6-methyl-pyrimidinyl-4-, 2,5,6-tris-methylsulfonyl-pyrimidinyl-4-, 2-methylsulfonyl-5,6-dimethyl-pyrimidinyl-4-, 2-ethylsulfonyl-5-chloro-6-methyl-pyrimidinyl-4-, 2-methyl-sulfonyl-6-chloro-pyrimidinyl-4-, 2,6-bis-methylsulfonyl-5-chloro-pyrimidinyl-4-, 2-methylsulfonyl-6-carboxy-pyrimidinyl-4-, 2-methylsulfonyl-5-carboxy-pyrimidinyl-4-, 2-methylsulfonyl-5-cyano-6-methoxy-pyrimidinyl-4-, 2-methylsulfonyl-5-chloropyrimidinyl-4-, 2-sulfoethylsulfonyl-6-methyl-pyrimidinyl-4-, 2-methyl-sulfonyl-5-bromo-pyrimidinyl-4-, 2-phenylsulfonyl-5-chloro-pyrimidinyl-4-, 2-carboxymethylsulfonyl-5-chloro-6-methyl-pyrimidinyl-4-, 2-methylsulfonyl-6-chloropyrimidine-4- and -5-carbonyl-, 2,6-bis-(methylsulfonyl)-pyrimidine-4- or -5-carbonyl-, 2-ethylsulfonyl-6-chloropyrimidine-5carbonyl-, 2,4-bis-(methylsulfonyl)-pyrimidine-5-sulfonyl-, 2-methylsulfonyl-4-chloro-6-methyl-pyrimidine-5-sulfonyl- or -carbonyl-; triazine rings containing ammonium groups, such as 2-trimethylammonium-4-phenylamino- or -4-(o-, m- or p-sulfophenyl)-aminotriazinyl-6-, 2-(1,1-dimethylhydrazinium)-4-phenylamino or -4-(o-, m- or p-sulfophenyl)-aminotriazinyl-6-, 2-(2-isopropylidene-1,1-dimethyl)-hydrazinium-4-phenylamino- or -4-(o-, m- or p-sulfophenyl)-aminotriazinyl-6-, 2-N-aminopyrrolidinium- or 2-N-aminopiperidinium-4-phenylamino- or -4-(o-, m- or p-sulfophenyl)-aminotriazinyl-6-, furthermore, 4-phenylamino or 4-(sulfophenyl-amino)-triazinyl-6 radicals containing the 1,4-bis-azabicyclo-[2,2,2]-octane or the 1,2-bis-aza-bicyclo[0,3,3]-octane bound quarternarily, in 2-position, over a nitrogen compound, 2-pyridinium-4-phenylamino- or -4-(o-, m- or p-sulfophenyl)-amino-triazinyl-6-as well as corresponding 2-oniumtriazinyl-6 radicals, which are substituted, in 4-position, by alkylamino groups, such as methylamino, ethylamino or β-hydroxyethylamino or alkoxy groups, such as methoxy or ethoxy groups, or aroxy groups, such as phenoxy or sulfophenoxy groups; 2- or 3-monochloro- or 2,3-dichloroquinoxaline derivatives and the corresponding bromo compounds; 2-chlorobenzthiazole-5- or -5-carbonyl- or -5- or -6-sulfonyl, 2-arylsulfonyl- or -alkylsulfonylbenzthiazole-5- or -6-carbonyl or -5- or -6-sulfonyl, such as 2-methylsulfonyl- or 2-ethyl-sulfonyl-benzthiazole-5- or -6-sulfonyl or -carbonyl, 2-phenyl-sulfonyl-benzthiazole-5- or -6-sulfonyl or carbonyl derivatives and the corresponding 2-sulfonyl-benzthiazole-5- or -6-carbonyl or -sulfonyl derivatives containing sulfo groups in the benzene ring fixed by condensation, 2-chlorobenzoxazole-5- or -6-carbonyl or -sulfonyl, 2-chlorobenzimidazole-5-or -6-carbonyl or -sulfonyl, 2-chloro-1-methylbenzimidazole-5-or -6-carbonyl or -sulfonyl, 2-chloro-4-methylthiazole-(1,3)-5-carbonyl or -4- or -5-sulfonyl compounds, N-oxyde of 4-chloro- or 4-nitroquinoline-5-carbonyl, as well as isocyanates, such as 3-β-chloroethylsulfonyl-phenyl-isocyanate. Furthermore, there are to be mentioned reactive groups of the aliphatic series, such as acryloyl groups, mono-, di- or trichloroacryloyl groups, such as -CO-CH=CH-Cl, -CO-CCl=CH₂, -CO-CCl=CH-CH₃, also -CO-CCl-CH=CH-COOH, -CO-CH=CCl-COOH, β-chloropropionyl, 3-phenyl-sulfonylpropionyl, 3-methylsulfonylpropionyl, 3-phenylsulfonylpropionyl, β-sulfato-ethylaminosulfonyl, vinylsulfonyl, β-chloro-ethyl-sulfonyl, β-sulfatoethylsulfonyl, β-thiosulfatoethylsulfonyl,

—SO₂—CH₂—CH₂—O—CO—CH₃,
—SO₂—CH₂—CH₂—O—CO—C₆H₅,

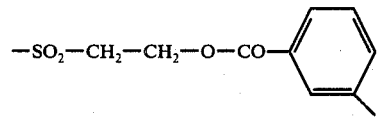

—SO₂—CH₂—CH₂—O—CO—NH—C₆H₅,
—SO₂—CH₂—CH₂—N—SO₂—CH₃,
　　　　　　　　　　　　｜
　　　　　　　　　　　　CH₃
—SO₂—CH₂—CH₂—O—C₆H₅,

—SO₂-CH₂-CH₂-O-CO-CH₂-CH₂-COOH, —SO₂-CH₂-CH₂-O-CO-CH=CH-COOH, β-methyl-sulfonyl-ethylsulfonyl, β-phenylsulfonyl-ethylsulfonyl, 2-fluoro-2-chloro-3,3-difluorocyclobutane-1-carbonyl, 2,2,3,3-tetrafluorocyclobutanecarbonyl-1 or -sulfonyl-1, β-(2,2,3,3-tetrafluorocyclobutyl-1)-acryloyl, β-(2,2,3,3-tetrafluoro-4-methyl-cyclobutyl-1)-acryloyl groups or β-bromoacryloyl, α- or β-alkyl or -arylsulfonyl-acryloyl groups, such as α- or β-methyl-sulfonylacryloyl.

After their synthesis, water-soluble reactive dyestuffs are commonly isolated in such a way that they are salted out from the aqueous reaction solution, that the precipitated salt-dyestuff mixture is suction-filtered and the press cake obtained is dried. Another technically common method to isolate the dissolved dyestuff, which is usually easy to dissolve in water, from the synthesis solution, is the direct drying, for example the spray drying, of the preparation solution.

For the desired dyeing purpose, the saliferous dyestuff powder is usually adjusted, after the drying process, to a determined dyestuff content, by the admixture of neutral inorganic salts, such as, for example, sodium sulfate.

However, these common adjustments of powders of reactive dyestuffs have several drawbacks which are derived particularly from the dust formation of these pulverulent dyeing preparations when they are being handled, for example, to be emptied or refilled, weighed and measured, or in the preparation of the dye baths or printing pastes. In this connection, this dust formation not only represents an annoyance for the workers in the manufacturing plant or the application unit, but in the dyeing or printing processes it may also lead to unpleasant specks of undyed or already dyed merchandise, due to the settling of the dyestuff dust. On the other hand, the dust removal of pulverulent dyestuffs by means of the common dust removing agents on the basis of mineral oil always involves the risk of oily deposits in the dyeing and printing operations, which leads to stained, and thus useless, dyeings and printings. Moreover, these pulverulent dyestuffs often prevent the application of measures of rationalization which are technically desirable, such as, for example, continuous dyeing processes or automatic measuring and weighing devices.

These drawbacks which are equally true for the pulverulent dyestuffs of formula (I) are completely avoided by the liquid dyestuff preparations of the invention. Moreover, the novel preparations have the advantage, both for the dyestuff producers and those who use them, in comparison with the pulverulent dyestuff adjustments, that the salt charge of the waste water is considerably reduced.

The novel liquid dyeing preparations of the dyestuffs of formula (I) are prepared in such a way - in accordance with the invention - that the clarified dyestuff solution obtained in the synthesis is used directly and is optionally, i.e. advantageously, adjusted to the desired higher dyestuff content, either by concentration, for example, by distillation of a part of the water in vacuo, or advantageously by adding a dried, for example spray-dried, proportion of the same clarified dyestuff solution obtained in the synthesis, in which process buffer substances are also added to this dyestuff solution in all cases.

For the preparation of these dyeing compositions according to the invention which have up to 35% by weight of dyestuff, it is advantageous to use aqueous clarified dyestuff solutions as starting compounds, which have a content of inert salts, such as sodium sulfate or sodium chloride, that is as low as possible and is less than 50% by weight of the dyestuff content of these dyestuff solutions obtained in the synthesis. For the preparation of dyeing compositions having a lower dyestuff content, such as those containing up to 15% by weight of dyestuff, the content of inert salt of the starting solutions should be lower than their dyestuff content. As a rule, the content of inert salt of the aqueous dyestuff solutions obtained in the synthesis is below these limits. In order to keep the content of inert salts below these limits, also for solutions of the reactive dyestuff with the β-sulfatoethylsulfonyl group which has been obtained by esterification of the β-hydroxyethylsulfonyl group with concentrated sulfuric acid, the excess sulfuric acid necessary for the formation of this sulfuric acid semi-ester group cannot be neutralized with sodium hydroxide solution or other reagents which lead to easily soluble inert salts. It is recommended, rather, to neutralize the excess sulfuric acid with calcium carbonate and to separate the dyestuff solution from the difficulty soluble calcium sulfate by way of filtration. This process has been described, inter alia, in German Offenlegungsschriften No. 1.955.849, Example 1; No. 2.049.664, Example 1, and No. 2.060.081, Example 2.

The solutions of dyestuffs of the formula (I) obtained in the synthesis contain from 3 to 20% by weight of dyestuff and can be brought to a dyestuff content of from about 30 to 35% by weight, by the addition of dried dyestuff or by the distillation of water in vacuo.

For the dyestuff producer, there is no need anymore to handle the mother liquors which have a very high content of salt and which are partially saturated with salt, and also for those who use the dyestuffs, the salt content of the waste water is considerably reduced, since the amounts of salt used for the adjustment of the dyestuff powders are no longer required for the adjustment in the liquid state according to the invention.

For the dyeing preparations of the invention, all buffer substances are suitable that are unable to react chemically with the reactive group Z, which would lead to a reduced dyestuff yield, such as sodium and potassium acetate, sodium and potassium oxalate, the acid sodium and potassium salts of phosphoric acid, the different primary, secondary and tertiary sodium or potassium salts of phosphoric acid or its mixtures, as well as sodium borate. There are to be mentioned, preferably, sodium borate and disodium-hydrogenophosphate as well as sodium-dihydrogeno-phosphate.

The mechanism of the reaction of reactive dyestuffs with cellulose fibers is generally known. Thus, for example, in the case of reactive dyestuffs of the vinylsulfone type, the formation of the covalent bond between the fiber substrate and the dyestuff molecule according to the reaction (4) of the scheme 1 shown below, after conversion of the β-sulfatoethylsulfonyl group into the vinyl-sulfone group, in the presence of agents having an alkaline effect in accordance with reaction (1), leads to the known good fastness properties of dyeings with these reactive dyestuffs.

The same is true, for example, for the reactive dyestuffs with halogeno-triazinyl radicals, in which the covalent bond with the fiber is formed in accordance with reaction (6) of the scheme 2.

However, it has been known from the use of the reactive dyestuffs with the β-sulfatoethyl-sulfonyl group, for example, that this reactive group, as it does in the form of its vinylsulfonyl group, with water shows a reaction - not only in the presence of alkalies, but also in the acid range - that is concurrent with the dyeing reaction (4) itself, according to reactions (2) or (3) of the scheme, and results in the β-hydroxyethyl-sulfonyl group which is but slow to react with the fiber substrate.

Scheme 1:

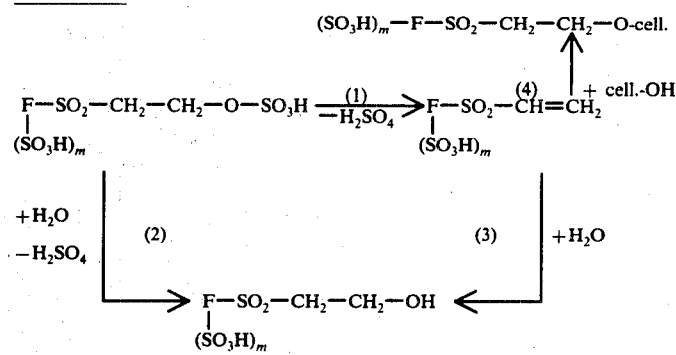

Scheme 2:

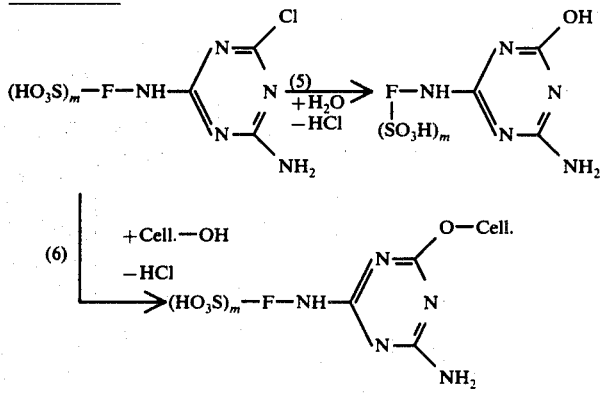

wherein F represents the radical of the dyestuff molecule and m has the above meaning, and cell.-OH stands for the cellulose.

The hydrolysis (2) and the addition of water (3) are practically irreversible under dyeing conditions and thus reduce the dyestuff yield.

In the case of the 2-amino-4-chlorotriazinyl group, for example, the hydrolysis (5) leads to a 2-amino-4-hydroxytriazinyl group. In this case, too, the hydrolysis (5) is practically irreversible under dyeing conditions, which leads to a reduced dyestuff yield, as the 2-amino-4-hydroxytriazinyl group is unable to react while forming a covalent bond with the fiber.

Thus, it was even more surprising to find that neutral to slightly acid aqueous buffered solutions of the reactive dyestuffs (I) can be stored over a fairly long time without a reduction in their tinctorial strength. Aqueous solutions of the dyestuffs of formula (I) according to the invention yield dyeings and prints of an unaltered tinctorial strength, even after a storage of several months, for example, 6 months, at room temperature or after a storage of several weeks, for example 8 weeks, at a temperature of 50° C.

The dyeing preparations of the invention are suitable for the dyeing and printing of fiber materials on the basis of wool, silk, polyamide and natural or regenerated cellulose, or on the basis of fiber mixtures containing one or several of the types of fiber mentioned, according to the process which is common for reactive dyestuffs and which is generally known, after dilution with water and, optionally, after the addition of common dyeing auxiliary agents, or in corresponding manner, after the addition of thickening agents common in the printing process and, optionally, of printing auxiliary agents.

The dyestuffs contained in the dyeing preparations of the invention have generally from 2 to 6 sulfo groups. Of these dyestuffs to be used in accordance with the invention, the mono- and the disazo dyestuffs, as well as their copper, cobalt and chromium complex compounds, are particularly interesting, for example, the dyestuffs of the general formulas (II) and (III)

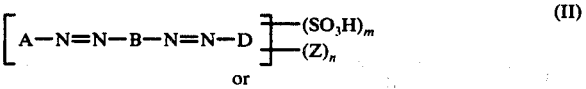

or

in which A represents a benzene or naphthalene nucleus, which may contain 1, 2 or 3 substituents from the series of fluorine, chlorine, bromine, lower alkyl, lower alkoxy, trifluoromethyl, acetylamino, benzoylamino, chloroacetylamino, methylbenzoylamino, chlorobenzoyl-amino, carboxy, lower alkylsulfonyl, lower alkylsulfonyl-amino, phenylsulfonyl-amino, carbonamide, N-alkyl- and N-phenyl-substituted carbonamide, sulfonamide, N-alkyl- and N-phenyl-substituted sulfonamide;

B has the same meaning as A, however, preferably representing a naphthalene nucleus which may be substituted, for example, by acetylamino, chloroacetylamino, benzoylamino, carboxy, carbonamide, sulfonamide, lower alkyl-sulfonylamino, phenylsulfonylamino, lower alkylsulfonyl or phenylsulfonyl groups, B additionally containing, optionally, one or two hydroxy and/or amino or lower alkylamino or phenylamino groups standing in ortho position to one or to both azo groups, D has the same meaning as B or represents a pyrazole-4-yl radical which is substituted in 3-position by a methyl, carboxy, cabonamide or carboxylic acid alkyl ester group having from 2 to 5 carbon atoms, and which carries in 5-position a hydroxy or an amino group, and which contains in 1-position a bound phenyl or naphthyl radical, which may be substituted by 1, 2 or 3 substituents from the series of acetylamino, benzoylamino, lower alkyl, lower alkoxy, carboxy, carbonamide, sulfonamide, nitro, chlorine and bromine, and in which the sulfo groups and the reactive radical(s) Z are linked to the aromatic radicals of A, B and/or or D, and m represents the FIGS. 2, 3, 4, 5 or 6, and n stands for 1 or 2; or their Cu, Co and Cr complex compounds, the carbocyclic aromatic nuclei of radicals A, B and/or D in formulas (II) and (III) containing the radical of a hydroxy, amino and/or a carboxy group bound to the metal atom.

Of these dyeing preparations according to the invention, preference is given to those, in which A represents a benzene nucleus possibly containing 1 or 2 substituents from the series of chlorine, bromine, lower alkyl, lower alkoxy, acetylamino, carboxy, sulfonamide, or A represents a naphthalene nucleus optionally containing an acetylamino, carboxy, sulfonamide, carbonamide, or a chloroacetylamino group;

B stands for a naphthalene nucleus optionally being substituted by acetylamino, chloroacetylamino, carboxy, carbonamide, or sulfonamide, and may additionally contain one or two hydroxy and/or amino or lower alkylamino or phenylamino groups bound in ortho-position to one or to both azo groups;

D has the same meaning as has been mentioned for A or B or represents a pyrazole-4-yl radical which is substituted in 3-position by a methyl, carboxy, carbonamide or carboxylic acid alkyl ester group having 2 or 3 carbon atoms, which carries a hydroxy or amino group in 5-position and contains a phenyl or a naphthyl radical bound in 1-position, which radical may be substituted by 1, 2 or 3 substituents from the series of acetylamio, lower alkyl, lower alkoxy, carboxy, carbonamide, sulfonamide, nitro, chlorine, and bromine, and in which the sulfo groups and the reactive radical(s) Z are linked to the aromatic radicals of A, B and/or D, and m represents the FIGS. 2, 3, 4, 5 or 6, and n stands for 1 or 2;

as well as their Cu, Co and Cr complex compounds, the carbocyclic aromatic nuclei of A, B and/or D containing the radical of a hydroxy, amino and/or a carboxy group bound to the metal atom.

Of these, use is to be made particularly of those containing dyestuffs, in which D stands for a radical of the formula

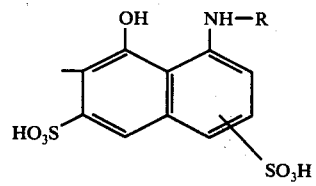

wherein R is an alkanoyl radical having from 2 to 4 carbon atoms, the hydroxy group being bound — in the case of the metal complex dyestuffs — as complex-forming group to the metal atom.

Furthermore, those dyeing preparations of the invention are interesting which contain copper phthalocyanine dyestuffs having from 2 to 6 sulfo groups.

Of the dyeing preparations of the invention, those dyeing preparations represent a preferred composition of the present invention which contain dyestuffs with a vinylsulfonyl, β-thiosulfatoethyl-sulfonyl, β-phosphatoethylsulfonyl, β-chloroethylsulfonyl, β-sulfatoethylsulfonyl, β-sulfatoethylsulfonyl-N-(alkyl 1-4 C)-amido or a vinylsulfonyl-N-(alkyl 1-4 C)-amido reactive group.

Of these, preference is given to those dyeing preparations which contain dyestuffs having a β-thiosulfatoethylsulfonyl, β-phosphatoethylsulfonyl, or β-sulfatoethylsulfonyl-N-methyl-amido reactive group, particularly those containing dyestuffs with a β-sulfatoethylsulfonyl reactive group.

Moreover, those dyeing preparations represent a preferred composition of the present invention which contain the dyestuffs described in the following Examples 1 to 12, 21 to 26 and 28.

The following Examples serve to illustrate the invention.

EXAMPLE 1

150 Parts by weight of an aqueous clarified dyestuff solution of the dyestuff of the following formula (known from German Offenlegungsschrift No. 1.544.538, 1st Example of the Table given on page 24)

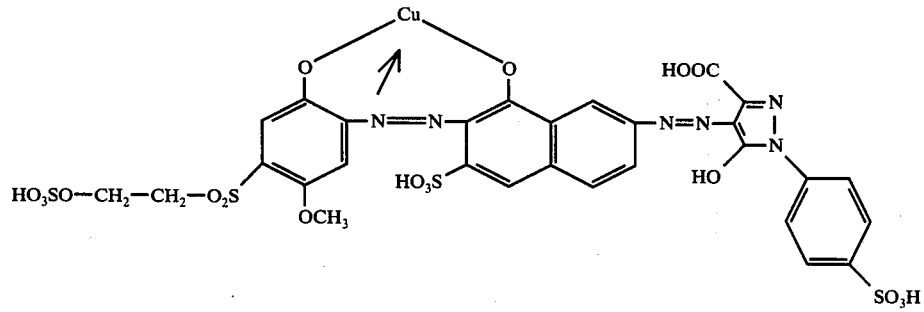

having a pH value of 5.8 and a dyestuff content of 15% by weight, which solution had been obtained in usual manner in the synthesis of the dyestuff by diazotizing and coupling corresponding starting compounds and by way of the complex formation, were mixed, while stirring, with 36 parts by weight of a dry dyestuff powder having a dyestuff content of 70% by weight, the powder having been obtained by spray drying another part of the same clarified dyestuff solution. The 186 parts by weight thus obtained of an aqueous solution containing 25.7% by weight of pure dyestuff yielded, after the addition of 5 parts by weight of disodiumhydrogenophosphate, 191 parts by weight of an aqueous dyeing preparation having a content of pure dyestuff of 25% by weight and a pH value of 6.2.

Using 2 parts by weight of this solution, dye baths, padding liquors and printing pastes were prepared each time according to known and common processes which — when applied onto cotton and fixed according to methods common for reactive dyestuffs — yielded black or grey dyeings and prints which had the same tinctorial strength as those prepared while using accordingly dye baths, padding liquors or printing pastes of the same concentration, with 1 part by weight of a powder formulation containing 50% by weight of pure dyestuff.

This tinctorial strength of the prints and dyeings was maintained unaltered when the novel aqueous preparation mentioned above was stored at 50° C for 6 weeks in a closed vessel.

EXAMPLE 2

200 Parts by weight of an aqueous clarified dyestuff solution of the dyestuff mentioned in Example 1 having a pH value of 5.7 and a dyestuff content of about 11% by weight, which solution had been obtained in usual manner in the synthesis of the dyestuff by diazotizing and coupling corresponding starting compounds and by way of the complex formation, were mixed, while stirring, with 48 parts by weight of a dry dyestuff powder having a dyestuff content of 60% by weight, the powder having been obtained by spray drying another part of the same clarified dyestuff solution. The 248 parts by weight thus obtained of an aqueous solution containing 20.5% by weight of pure dyestuff yielded — after the addition of 6 parts by weight of disodiumhydrogenophoshate — 254 parts by weight of an aqueous dyeing preparation having a content of pure dyestuff of 20% by weight and a pH value of 6.0.

Using 5 parts by weight of this solution, dye baths, padding liquors and printing pastes were prepared each time according to known and common processes which — when applied onto cotton and fixed according to methods common for reactive dyestuffs — yielded black or grey dyeings and prints which had the same tinctorial strength as those prepared while using accordingly dye baths, padding liquors or printing pastes of the same concentration, with 2 parts by weight of a powder formulation containing 50% by weight of pure dyestuff.

This tinctorial strength of the prints and dyeings was maintained unaltered when the novel aqueous preparation mentioned above was stored at 20° C for 3 months in a closed vessel.

EXAMPLE 3

150 Parts by weight of an aqueous clarified dyestuff solution of the dyestuff mentioned in Example 1 having a pH value of 5.8 and a dyestuff content of 15% by weight, which solution had been obtained in usual manner in the synthesis of the dyestuff by diazotizing and coupling corresponding starting compounds and by way of the complex formation, were mixed with 5 parts by weight of disodiumhydrogenophosphate. Of this dyestuff solution, 65 parts by weight of water were distilled off, while stirring at 60° C and under vacuum of 18 Torr. 90 Parts by weight of an aqueous dyeing preparation were obtained which had a content of pure dyestuff of 25% by weight and a pH value of 6.4 at 20° C.

Using 2 parts by weight of this solution, dye baths, padding liquors and printing pastes were prepared each time according to known and common processes which — when applied onto cotton and fixed according to methods common for reactive dyestuffs — yielded black or grey dyeings and prints which had the same tinctorial strength as those prepared while using accordingly dye baths, padding liquors or printing pastes of the same concentration, with 1 part by weight of a powder formulation containing 50% by weight of pure dyestuff.

This tinctorial strength of the prints and dyeings was maintained unaltered when the novel aqueous preparation mentioned above was stored at 50° C for 6 weeks in a closed vessel.

EXAMPLE 4

200 Parts by weight of an aqueous clarified dyestuff solution of the dyestuff mentioned in Example 1 having a pH value of 5.7 and a dyestuff content of 11% by weight, which solution had been obtained in usual manner in the synthesis of the dyestuff by diazotizing and coupling corresponding starting compounds and by way of the complex formation, were mixed, while stirring, with 48 parts by weight of a dry dyestuff powder having a dyestuff content of 60% by weight, the powder having been obtained by spray drying another part of the same clarified dyestuff solution. The 248 parts by weight thus obtained of an aqueous solution containing 20.5% by weight of pure dyestuff yielded — after the addition of 6 parts by weight of sodium borate — 254 parts by weight of an aqueous dyeing preparation having a content of pure dyestuff of 20% by weight and a pH value of 5.9.

Using 5 parts by weight of this solution, dye baths, padding liquors and printing pastes were prepared each time according to known and common processes which — when applied onto cotton and fixed according to methods common for reactive dyestuffs — yielded black or grey dyeings and prints which had the same tinctorial strength as those prepared while using accordingly dye baths, padding liquors or printing pastes of the same concentration, with 2 parts by weight of a powder formulation containing 50% by weight of pure dyestuff.

This tinctorial strength of the prints and dyeings was maintained unaltered, when the novel aqueous preparation mentioned above was stored at 20° C for 3 months in a closed vessel.

EXAMPLE 5

200 Parts by weight of an aqueous clarified dyestuff solution of the dyestuff corresponding to the formula

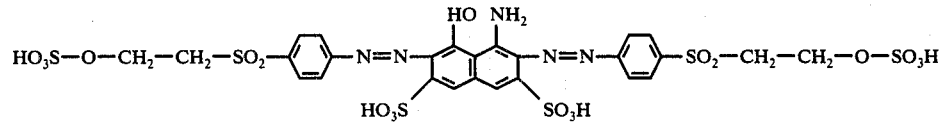

(which has been known from German Auslegeschrift No. 1.619.491, Example 8) and having a pH value of 6.0 and a dyestuff content of 15% by weight, which solution had been obtained in usual manner in the synthesis of the dyestuff by diazotizing and coupling corresponding starting compounds, were mixed, while stirring, with 37 parts by weight of a dry dyestuff powder having a dyestuff content of 67% by weight, the powder having been obtained by spray drying another part of the same clarified dyestuff solution. The 237 parts by weight thus obtained of an aqueous solution containing 23.1% by weight of pure dyestuff and having a pH value of 6.0 yielded — after the addition of 6 parts by weight of disodiumhydrogenophosphate — an aqueous dyeing preparation having a content of pure dyestuff of 22.5% by weight and a pH value of 6.2.

Using 2 parts by weight of this pH-stabilized solution, dye baths, padding liquors and printing pastes were prepared each time according to known and common processes which — when applied onto cotton and fixed according to methods common for reactive dyestuffs — yielded black or grey dyeings and prints which had the same tinctorial strength as those prepared while using accordingly dye baths, padding liquors or printing pastes of the same concentration, with 1 part by weight of a powder formulation containing 45% by weight of pure dyestuff.

This tinctorial strength of the prints and dyeings was maintained unaltered, when the novel aqueous preparation mentioned above was stored at 50° C for 6 weeks in a closed vessel.

EXAMPLE 6

200 Parts by weight of an aqueous clarified dyestuff solution of the dyestuff mentioned in Example 5 having a pH value of 5.5 and a dyestuff content of about 14.5% by weight, which solution had been obtained in usual manner in the synthesis of the dyestuff by diazotizing and coupling corresponding starting compounds, were mixed, while stirring, with 45 parts by weight of a dry dyestuff powder having a dyestuff content of 64% by weight, the powder having been obtained by spray drying another part of the same clarified dyestuff solution. The 245 parts by weight thus obtained of an aqueous solution containing 23.6% by weight of pure dyestuff yielded — after the addition of 12 parts by weight of disodiumhydrogenophosphate — 257 parts by weight of an aqueous dyeing preparation having a content of pure dyestuff of 22.5% by weight and a pH value of 6.2.

Using 2 parts by weight of this pH-stabilized solution, dye baths, padding liquors and printing pastes were prepared each time according to known and common processes which — when applied onto cotton and fixed according to methods common for reactive dyestuffs — yielded black or grey dyeings and prints which had the same tinctorial strength as those prepared while using accordingly dye baths, padding liquors or printing pastes of the same concentration, with 1 part by weight of a powder formulation containing 45% by weight of pure dyestuff.

This tinctorial strength of the prints and dyeings was maintained unaltered, when the novel aqueous preparation mentioned above was stored at 20° C for 4 months in a closed vessel.

EXAMPLE 7

200 Parts by weight of an aqueous clarified dyestuff solution of the dyestuff mentioned in Example 5 having a pH value of 5.5 and a dyestuff content of 14.5% by weight, which solution had been obtained in usual manner in the synthesis of the dyestuff by diazotizing and coupling corresponding starting compounds, were mixed with 12 parts by weight of disodiumhydrogenophosphate. Of this dyestuff solution, 83 parts by weight of water were distilled off, while stirring at 60° C and under a vacuum of 18 Torr. 129 Parts by weight of an aqueous dyeing preparation were obtained which had a content of pure dyestuff of 22.5% by weight and a pH value of 6.5 at 20° C.

Using 2 parts by weight of this solution, dye baths, padding liquors and printing pastes were prepared each time according to known and common processes which — when applied onto cotton and fixed according to methods common for reactive dyestuffs — yielded black or grey dyeings and prints which had the same tinctorial strength as those prepared while using accordingly dye baths, padding liquors or printing pastes of the same concentration, with 1 part by weight of a powder formulation containing 45% by weight of pure dyestuff.

This tinctorial strength of the prints and dyeings was maintained unaltered, when the novel aqueous preparation mentioned above was stored at 50° C for 6 weeks in a closed vessel.

EXAMPLE 8

200 Parts by weight of an aqueous clarified dyestuff solution of the dyestuff mentioned in Example 5 having a pH value of 6.0 and a dyestuff content of 12% by weight, which solution had been obtained in usual manner in the synthesis of the dyestuff by diazotizing and coupling corresponding starting compounds, were mixed, while stirring, with 14 parts by weight of a dry dyestuff powder having a dyestuff content of 67% by weight, the powder having been obtained by spray drying another part of the same clarified dyestuff solution. The 214 parts by weight thus obtained of an aqueous solution containing 15.6% by weight of pure dyestuff and having a pH value of 6.0 yielded — after the addition of 8 parts by weight of sodium borate — an aqueous dyeing preparation having a content of pure dyestuff of 15% by weight and a pH value of 6.2.

Using 3 parts by weight of this pH-stabilized solution, dye baths, padding liquors and printing pastes were prepared each time according to known and common processes which — when applied onto cotton and fixed according to methods common for reactive dyestuffs — yielded black or grey dyeings and prints which had the same tinctorial strength as those prepared while using accordingly dye baths, padding liquors or printing pastes of the same concentration, with 1 part by weight of a powder formulation containing 45% by weight of pure dyestuff.

This tinctorial strength of the prints and dyeings was maintained unaltered, when the novel aqueous preparation mentioned above was stored at 20° C for 4 months in a closed vessel.

EXAMPLE 9

100 Parts by weight of an aqueous clarified dyestuff solution of the dyestuff corresponding to the formula

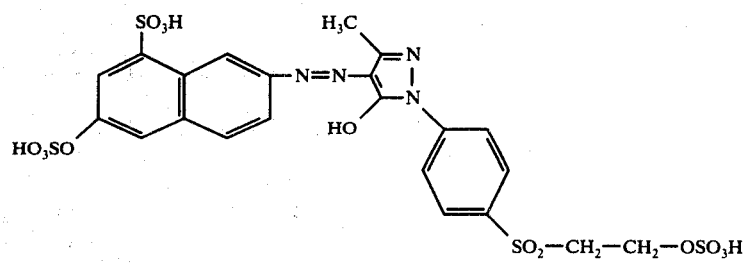

(which has been known from German Offenlegungsschrift No. 1.804.524, Examples 4 and 5) and having a pH value of 6.0 and a dyestuff content of 15% by weight, which solution had been obtained in usual manner in the synthesis of the dyestuff by diazotizing and coupling corresponding starting compounds, were mixed, while stirring, with 24.5 parts by weight of a dry dyestuff powder having a dyestuff content of 67% by weight, the powder having been obtained by spray drying another part of the same clarified dyestuff solution. The 124.5 parts by weight thus obtained of an aqueous solution containing 25.3% by weight of pure dyestuff and having a pH value of 6 yielded — after the addition of 2 parts by weight of disodiumhydrogenophosphate — an aqueous dyeing preparation having a content of pure dyestuff of 25% by weight and again a pH value of 6.0.

Using 2 parts by weight of this pH-stabilized solution, dye baths, padding liquors and printing pastes were prepared each time according to known and common processes which — when applied onto cotton and fixed according to methods common for reactive dyestuffs — yielded yellow dyeings and prints which had the same tinctorial strength as those prepared while using accordingly dye baths, padding liquors or printing pastes of the same concentration, with 1 part by weight of a powder formulation containing 50% by weight of pure dyestuff.

This tinctorial strength of the prints and dyeings was maintained unaltered, when the novel aqueous preparation mentioned above was stored at 50° C for 6 weeks in a closed vessel.

EXAMPLE 10

200 Parts by weight of an aqueous clarified dyestuff solution of the dyestuff mentioned in Example 9 having a pH value of 5.8 and a dyestuff content of about 13% by weight, which solution had been obtained in usual manner in the synthesis of the dyestuff by diazotizing and coupling corresponding starting compounds, were mixed, while stirring, with 34 parts by weight of a dry dyestuff powder having a dyestuff content of 65% by weight, the powder having been obtained by spray drying another part of the same clarified dyestuff solution. The 234 parts by weight thus obtained of an aqueous solution containing 20.5% by weight of pure dyestuff yielded — after the addition of 6 parts by weight of disodiumhydrogenophosphate — an aqueous dyeing preparation having a content of pure dyestuff of 20% by weight and a pH value of 6.1.

Using 5 parts by weight of this pH-stabilized solution, dye baths, padding liquors and printing pastes were prepared each time according to known and common processes which — when applied onto cotton and fixed according to methods common for reactive dyestuffs — yielded yellow dyeings and prints which had the same tinctorial strength as those prepared while using accordingly dye baths, padding liquors or printing pastes of the same concentration, with 2 parts by weight of a powder formulation containing 50% by weight of pure dyestuff.

This tinctorial strength of the prints and dyeings was maintained unaltered, when the novel aqueous preparation mentioned above was stored at 20° C for 3 months in a closed vessel.

EXAMPLE 11

200 Parts by weight of an aqueous clarified dyestuff solution of the dyestuff mentioned in Example 9 having a pH value of 6 and a dyestuff content of 13% by weight, which solution had been obtained in usual manner in the synthesis of the dyestuff by diazotizing and coupling corresponding starting compounds, were mixed with 3 parts by weight of disodiumhydrogenophosphate. Of this dyestuff solution, 73 parts by weight of water were distilled off, while stirring at 60° C and under a vacuum of 18 Torr. 130 Parts by weight of an aqueous dyeing preparation were obtained which had a content of pure dyestuff of 20% by weight and a pH value of 6.1 at 20° C.

Using 5 parts by weight of this pH-stabilized solution, dye baths, padding liquors and printing pastes were prepared each time according to known and common processes which — when applied onto cotton and fixed according to methods common for reactive dyestuffs — yielded yellow dyeings and prints which had the same tinctorial strength as those prepared while using accordingly dye baths, padding liquors or printing pastes of the same concentration, with 2 parts by weight of a powder formulation containing 50% by weight of pure dyestuff.

This tinctorial strength of the prints and dyeings was maintained unaltered when the novel aqueous preparation mentioned above was stored at 20° C for 3 months in a closed vessel.

EXAMPLE 12

100 Parts by weight of an aqueous clarified dyestuff solution of the dyestuff mentioned in Example 9 having a pH value of 6 and a dyestuff content of 15% by weight, which solution had been obtained in usual manner in the synthesis of the dyestuff by diazotizing and coupling corresponding starting compounds, were mixed, while stirring, with 27 parts by weight of a dry dyestuff powder having a dyestuff content of 67% by weight, the powder having been obtained by spray drying another part of the same clarified dyestuff solution. The 127 parts by weight thus obtained of an aqueous solution containing 26.1% by weight of pure dyestuff yielded — after the addition of 8 parts by weight of sodium borate — an aqueous dyeing preparation having a content of pure dyestuff of 20% by weight and again a pH value of 6.

Using 2 parts by weight of this pH-stabilized solution, dye baths, padding liquors and printing pastes were prepared each time according to known and common processes which — when applied onto cotton and fixed according to methods common for reactive dyestuffs — yielded yellow dyeings and prints which had the same tinctorial strength as those prepared while using accordingly dye baths, padding liquors or printing pastes of the same concentration, with 1 part by weight of a powder formulation containing 50% by weight of pure dyestuff.

This tinctorial strength of the prints and dyeings was maintained unaltered, when the novel aqueous preparation mentioned above was stored at 50° C for 6 weeks in a closed vessel.

EXAMPLE 13

100 Parts by weight of an aqueous clarified dyestuff solution of the dyestuff corresponding to the formula

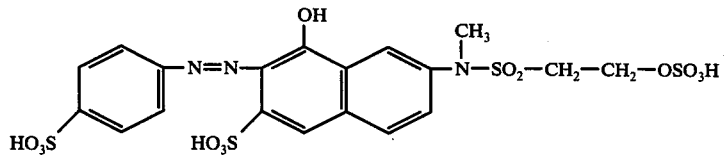

(which has been known from German Offenlegungsschrift No. 1.769.091, Example 6, and U.S. Pat. No. 3.419.541, Table Example 11) and having a pH value of 6.6 and a dyestuff content of 10% by weight, which solution had been obtained according to the method described in U.S. Pat. No. 3.419.541, Table Example 11, in the synthesis of the dyestuff by diazotizing and coupling corresponding starting compounds, were mixed, while stirring, with 30 parts by weight of a dry dyestuff powder having a dyestuff content of 55% by weight, the powder having been obtained by spray drying another part of the same clarified dyestuff solution. The 130 parts by weight thus obtained of an aqueous solution containing 20.4% by weight of pure dyestuff and having a pH value of 6.6 yielded — after the addition of 3 parts by weight of disodiumhydrogenophosphate — an aqueous dyeing preparation having a stabilized pH value of 6.6 and a content of pure dyestuff of 20% by weight.

Using 2 parts by weight of this solution, dye baths, padding liquors and printing pastes were prepared each time according to known and common processes which — when applied onto cotton and fixed according to methods common for reactive dyestuffs — yielded orange dyeings and prints which had the same tinctorial strength as those prepared while using accordingly dye baths, padding liquors or printing pastes of the same concentration, with 1 part by weight of a powder formulation containing 40% by weight of pure dyestuff.

This tinctorial strength of the prints and dyeings was maintained unaltered, when the novel aqueous preparation mentioned above was stored at 22° C for 3 months in a closed vessel.

EXAMPLE 14

200 Parts by weight of an aqueous clarified dyestuff solution of the dyestuff of the formula

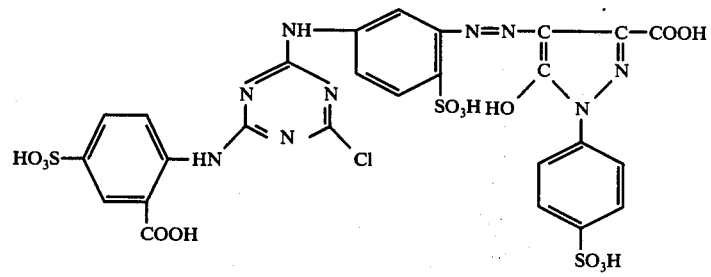

(known from German Auslegeschrift No. 1.232.294, Example 1) having a pH value of 5.9 and a dyestuff content of 12% by weight, which solution had been obtained according to the method described in German Auslegeschrift No. 1.232.294, Example 1, in the synthesis of the dyestuff by diazotizing and coupling corresponding starting compounds, were mixed, while stirring, with 46 parts by weight of a dry dyestuff powder having a dyestuff content of 57% by weight, the powder having been obtained by spray drying another part of the same clarified dyestuff solution. The 246 parts by weight thus obtained of an aqueous solution containing 20.4% by weight of pure dyestuff yielded, after the addition of 5 parts by weight of disodiumhydrogenophosphate, an aqueous dyeing preparation having a stabilized pH value of 6.1 and a content of pure dyestuff of 20% by weight.

Using 5 parts by weight of this solution, dye baths, padding liquors and printing pastes were prepared each time according to known and common processes which — when applied onto cotton and fixed according to methods common for reactive dyestuffs — yielded yellow dyeings and prints which had the same tinctorial strength as those prepared while using accordingly dye baths, padding liquors or printing pastes of the same concentration, with 2 parts by weight of a powder formulation containing 50% by weight of pure dyestuff.

This tinctorial strength of the prints and dyeings was maintained unaltered when the novel aqueous preparation mentioned above was stored at 50° C for 6 weeks in a closed vessel.

EXAMPLE 15

200 Parts by weight of an aqueous clarified dyestuff solution of the dyestuff of the formula

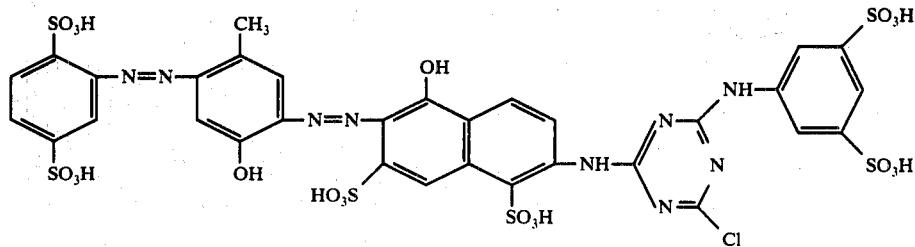

as a copper complex compound (known from German Auslegeschrift No. 1.156.914, Example 51) having a pH value of 5.3 and a dyestuff content of 9% by weight, which solution had been obtained according to the method described in German Auslegeschrift No. 1.156.914, Example 51, in the synthesis of the dyestuff by diazotizing and coupling corresponding starting compounds, were mixed, while stirring, with 84 parts by weight of a dry dyestuff powder having a dyestuff content of 57% by weight, the powder having been obtained by spray drying another part of the same clarified dyestuff solution. The 284 parts by weight thus obtained of an aqueous solution containing 23.3% by weight of pure dyestuff yielded — after the addition of 9 parts by weight of disodiumhydrogenophosphate — an aqueous dyeing preparation having a stabilized pH value of 6.0 and a content of pure dyestuff of 22.5% by weight.

Using 2 parts by weight of this solution, dye baths, padding liquors and printing pastes were prepared each time according to known and common processes which — when applied onto cotton and fixed according to methods common for reactive dyestuffs — yielded navy blue dyeings and prints which had the same tinctorial strength as those prepared while using accordingly dye baths, padding liquors or printing pastes of the same concentration, with 1 part by weight of a powder formulation containing 45% by weight of pure dyestuff.

This tinctorial strength of the prints and dyeings was maintained unaltered when the novel aqueous preparation mentioned above was stored at 20° C for 3 months in a closed vessel.

EXAMPLE 16

200 Parts by weight of an aqueous clarified dyestuff solution of the dyestuff of the formula

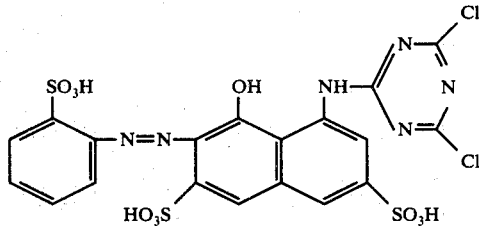

(known from German Patent No. 1.062.367, Examples 1, 3 and 4) having a pH value of 6.8 and a dyestuff content of 12% by weight, which solution had been obtained in the synthesis of the dyestuff by diazotizing and coupling corresponding starting compounds according to the method described in German Pat. No. 1.062.367, Example 1, were mixed, while stirring, with 72 parts by weight of a dry dyestuff powder having a dyestuff content of 66% by weight, the powder having been obtained by freeze drying another part of the same clarified dyestuff solution. The 272 parts by weight thus obtained of an aqueous solution containing 26.3% by weight of pure dyestuff yielded, after the addition of 15 parts by weight of disodiumhydrogenophosphate, an aqueous dyeing preparation having a stabilized pH value of 6.9 and a content of pure dyestuff of 25% by weight.

Using 2 parts by weight of this solution, dye baths, padding liquors and printing pastes were prepared each time according to known and common processes which — when applied onto cotton and fixed according to methods common for reactive dyestuffs — yielded red dyeings and prints which had the same tinctorial strength as those prepared while using accordingly dye baths, padding liquors or printing pastes of the same concentration, with 1 part by weight of a powder formulation containing 50% by weight of pure dyestuff.

This tinctorial strength of the prints and dyeings was maintained unaltered when the novel aqueous preparation mentioned above was stored at 22° C for 3 months in a closed vessel.

EXAMPLE 17

200 Parts by weight of an aqueous clarified dyestuff solution of the dyestuff corresponding to the formula

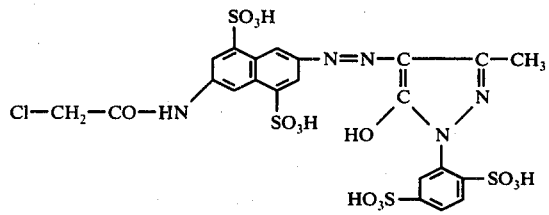

(which has been known from Belgian Patent No. 598.831, Example 21) having been freed from acetone in vacuo and having a pH value of 6.9 and a dyestuff content of 14% by weight, which solution had been obtained according to the method described in Belgian Patent No. 598,831, Example 4, in the synthesis of the dyestuff, were mixed, while stirring, with 35 parts by weight of a dry dyestuff powder having a dyestuff content of 62% by weight, the powder having been obtained by freeze drying another part of the same clarified dyestuff solution. The 235 parts by weight thus obtained of an aqueous solution containing 21.2% by weight of pure dyestuff yielded — after the addition of 9 parts by weight of disodiumhydrogenophosphate and 4 parts by weight of sodiumdihydrogenophosphate — an aqueous dyeing preparation having a stabilized pH value of 7.0 and a content of pure dyestuff of 20% by weight.

Using 5 parts by weight of this solution, dye baths, padding liquors and printing pastes were prepared each time according to known and common processes which — when applied onto cotton and fixed according to methods common for reactive dyestuffs — yielded yellow dyeings and prints which had the same tinctorial strength as those prepared while using accordingly dye baths, padding liquors or printing pastes of the same concentration, with 2 parts by weight of a powder formulation containing 50% by weight of pure dyestuff.

This tinctorial strength of the prints and dyeings was maintained unaltered when the novel aqueous preparation mentioned above was stored at 22° C for 3 months in a closed vessel.

EXAMPLE 18

100 Parts by weight of an aqueous clarified dyestuff solution of the dyestuff corresponding to the formula

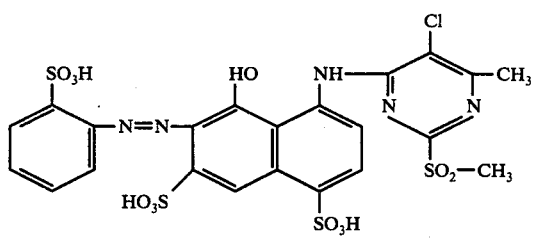

(which has been known from German Offenlegungsschrift No. 1.544.517, Table Example 218) and having a pH value of 5.8 and a dyestuff content of 11% by weight, which solution had been obtained in the synthesis of the dyestuff according to the method described in German Auslegeschrift No. 1.544.517, Example 206, were mixed, while stirring, with 30 parts by weight of a dry dyestuff powder having a dyestuff content of 53% by weight, the powder having been obtained by spray drying another part of the same clarified dyestuff solution. The 130 parts by weight thus obtained of an aqueous solution containing 20.7% by weight of pure dyestuff yielded — after the addition of 4.5 parts by weight of disodiumhydrogenophosphate — an aqueous dyeing preparation having a stabilized pH value of 6.1 and a content of pure dyestuff of 20% by weight.

Using 2 parts by weight of this solution, dye baths, padding liquors and printing pastes were prepared each time according to known and common processes which — when applied onto cotton and fixed according to methods common for reactive dyestuffs — yielded red dyeings and prints which had the same tinctorial strength as those prepared while using accordingly dye baths, padding liquors or printing pastes of the same concentration, with 1 part by weight of a powder formulation containing 40% by weight of pure dyestuff.

This tinctorial strength of the prints and dyeings was maintained unaltered when the novel aqueous preparation mentioned above was stored at 50° C for 6 weeks in a closed vessel.

EXAMPLE 19

100 Parts by weight of an aqueous clarified dyestuff solution of the dyestuff of the formula

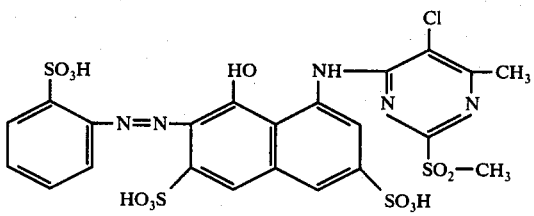

(known from German Offenlegungsschrift No. 1.544.517, Example 18, and from German Offenlegungsschrift No. 1.544.542, Example 344) having a pH value of 6.0 and a dyestuff content of 8% by weight, which solution had been obtained in the synthesis of the dyestuff by diazotizing and coupling corresponding starting compounds according to the method described in German Offenlegungsschrift No. 1.544.542, Example 344, were mixed, while stirring, with 43 parts by weight of a dry dyestuff powder having a dyestuff content of 58% by weight, the powder having been obtained by spray drying another part of the same clarified dyestuff solution. The 143 parts by weight thus obtained of an aqueous solution containing 23.1% by weight of pure dyestuff yielded, after the addition of 4 parts by weight of disodiumhydrogenophosphate, an aqueous dyeing preparation having a pH value of 6.2 and a content of pure dyestuff of 22.5% by weight.

Using 2 parts by weight of this solution, dye baths, padding liquors and printing pastes were prepared each time according to known and common processes which — when applied onto cotton and fixed according to methods common for reactive dyestuffs — yielded red dyeings and prints which had the same tinctorial strength as those prepared while using accordingly dye baths, padding liquors or printing pastes of the same concentration, with 1 part by weight of a powder formulation containing 45% by weight of pure dyestuff.

This tinctorial strength of the prints and dyeings was maintained unaltered when the novel aqueous preparation mentioned above was stored at 50° C for 6 weeks in a closed vessel.

EXAMPLE 20

200 Parts by weight of an aqueous clarified dyestuff solution of the dyestuff of the formula

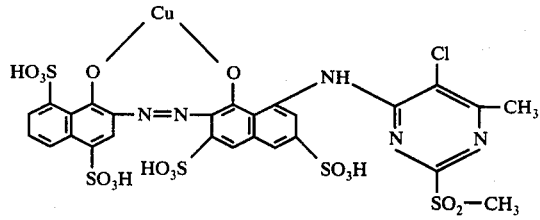

(known from German Offenlegungsschrift No. 1.544.542, Example 651), having a pH value of 5.5 and a dyestuff content of 12% by weight, which solution had been obtained in the synthesis of the dyestuff according to the method described in German Offenlegungsschrift No. 1.544.542, Example 651, were mixed, while stirring, with 45 parts by weight of a dry dyestuff powder having a dyestuff content of 60% by weight, the powder having been obtained by spray drying another part of the same clarified dyestuff solution. The 245 parts by weight thus obtained of an aqueous solution containing 20.8% by weight of pure dyestuff yielded, after the addition of 10 parts by weight of disodiumhydrogenophosphate, an aqueous dyeing preparation having a pH value of 6.2 and a content of pure dyestuff of 20% by weight.

Using 5 parts by weight of this solution, dye baths, padding liquors and printing pastes were prepared each time according to known and common processes which — when applied onto cotton and fixed according to methods common for reactive dyestuffs — yielded navy blue dyeings and prints which had the same tinctorial strength as those prepared while using accordingly dye baths, padding liquors or printing pastes of the same concentration, with 2 parts by weight of a powder formulation containing 50% by weight of pure dyestuff.

This tinctorial strength of the prints and dyeings was maintained unaltered when the novel aqueous preparation mentioned above was stored at 50° C for 6 weeks in a closed vessel.

EXAMPLE 21

100 Parts by weight of an aqueous clarified dyestuff solution of the dyestuff of the formula

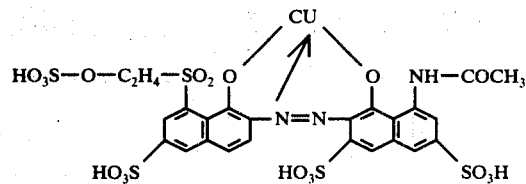

(known from German Offenlegungsschrift No. 2.010.656, Example 1), having a pH value of 5.2 and a dyestuff content of 10% by weight, which solution had been obtained in usual manner in the synthesis of the dyestuff by the diazotizing, coupling and oxydative coppering of corresponding starting compounds, were mixed, while stirring, with 25 parts by weight of a dry dyestuff powder having a dyestuff content of 67% by weight, the powder having been obtained by spray drying another part of the same clarified dyestuff solution. The 125 parts by weight thus obtained by an aqueous solution containing 21.5% by weight of pure dyestuff and having a pH value of 5.3 yielded, after the addition of 10 parts by weight of disodiumhydrogenophosphate, an aqueous dyeing preparation having a content of pure dyestuff of 20% by weight and a pH value of 6.0.

Using 2 parts by weight of this pH-stabilized solution, dye baths, padding liquors and printing pastes were prepared each time according to known and common processes which — when applied onto cotton and fixed according to methods common for reactive dyestuffs — yielded blue dyeings and prints which had the same tinctorial strength as those prepared while using accordingly dye baths, padding liquors or printing pastes of the same concentration, with 1 part by weight of a powder formulation containing 40% by weight of pure dyestuff.

This tinctorial strength of the prints and dyeings was maintained unaltered when the novel aqueous preparation mentioned above was stored at 50° C for 6 weeks in a closed vessel.

EXAMPLE 22

200 Parts by weight of an aqueous clarified dyestuff solution of the complex copper dyestuff mentioned in Example 21 having a pH value of 5.2 and a dyestuff content of about 8% by weight, which solution had been obtained in usual manner in the synthesis of the dyestuff by the diazotizing, coupling and oxydative coppering of corresponding starting compounds, were mixed, while stirring, with 53 parts by weight of a dry dyestuff powder having a dyestuff content of 70% by weight, the powder having been obtained by spray drying another part of the same clarified dyestuff solution. The 253 parts by weight thus obtained of an aqueous solution containing 21% by weight of pure dyestuff yield — after the addition of 13 parts by weight of disodiumhydrogenophosphate — an aqueous dyeing preparation having a content of pure dyestuff of 20% by weight and a pH value of 6.0.

Using 5 parts by weight of this pH-stabilized solution, dye baths, padding liquors and printing pastes were prepared each time according to known and common processes which — when applied onto cotton and fixed according to methods common for reactive dyestuffs — yielded blue dyeings and prints which had the same tinctorial strength as those prepared while using accordingly dye baths, padding liquors or printing pastes of the same concentration, with 2 parts by weight of a powder formulation containing 50% by weight of pure dyestuff.

This tinctorial strength of the prints and dyeings was maintained unaltered when the novel aqueous preparation mentioned above was stored at 20° C for 3 months in a closed vessel.

EXAMPLE 23

200 Parts by weight of an aqueous clarified dyestuff solution of the dyestuff mentioned in Example 21 having a pH value of 5.2 and a dyestuff content of 8% by weight, which solution had been obtained in usual manner in the synthesis of the dyestuff by the diazotizing, coupling and oxydative coppering of corresponding starting compounds, were mixed with 3 parts by weight of disodiumhydrogenophosphate. Of this dyestuff solution, 123 parts by weight of water were distilled off, while stirring at 60° C and under a vacuum of 18 Torr. 80 Parts by weight of an aqueous dyeing preparation were obtained which had a content of pure dyestuff or 20% by weight and a pH value of 6.1 at 20° C.

Using 2 parts by weight of this pH-stabilized solution, dye baths, padding liquors and printing pastes were prepared each time according to known and common processes which — when applied onto cotton and fixed according to methods common for reactive dyestuffs — yielded blue dyeings and prints which had the same tinctorial strength as those prepared while using accordingly dye baths, padding liquors or printing pastes of the same concentration, with 1 part by weight of a powder formulation containing 40% by weight of pure dyestuff.

This tinctorial strength of the prints and dyeings was maintained unaltered when the novel aqueous preparation mentioned above was stored at 20° C for 3 months in a closed vessel.

EXAMPLE 24

100 Parts by weight of an aqueous clarified dyestuff solution of the dyestuff mentioned in Example 21 having a pH value of 5.2 and a dyestuff content of 10% by weight, which solution had been obtained in usual manner in the synthesis of the dyestuff by the diazotizing, coupling and oxydative coppering of corresponding starting compounds, were mixed, while stirring, with 23 parts by weight of a dry dyestuff powder having a dyestuff content of 67% by weight, the powder having been obtained by spray drying another part of the same clarified dyestuff solution. The 123 parts by weight thus obtained in an aqueous solution containing 20.7% by weight of pure dyestuff yielded — after the addition of 4.5 parts by weight of sodium borate — an aqueous dyeing preparation having a content of pure dyestuff of 20% by weight and a pH value of 5.8.

Using 2 parts by weight of this pH-stabilized solution, dye baths, padding liquors and printing pastes were prepared each time according to known and common processes which — when applied onto cotton and fixed according to methods common for reactive dyestuffs — yielded blue dyeings and prints which had the same tinctorial strength as those prepared while using accordingly dye baths, padding liquors or printing pastes of the same concentration, with 1 part by weight of a powder formulation containing 50% by weight of pure dyestuff.

This tinctorial strength of the prints and dyeings was maintained unaltered, when the novel aqueous preparation mentioned above was stored at 50° C for 6 weeks in a closed vessel.

In an analogous manner — as has been described in the above-mentioned Examples — dyeing preparations of the invention have been, and are, obtained by means of other dyestuffs, for example, those specified in the following Table. The dyeing preparations of the invention containing these dyestuffs also show those properties that are technically advantageous, i.e. the fastness to storage and a facilitated technical utilization and application.

Table

| Ex. | Dyestuff | known from | Color shade on cotton |
|---|---|---|---|
| 25 | 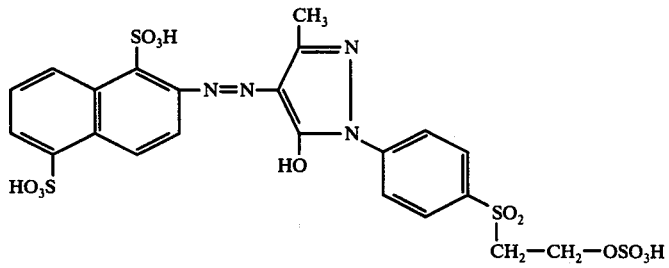 | German Patent No. 1.248.188, Example 1 | yellow |
| 26 | (HO$_3$S)$_2$—(CuPc)—(SO$_2$—CH$_2$—CH$_2$—OSO$_3$H)$_2$ | German Patent No. 1.179.317, Example 1 | turquoise |
| 27 | 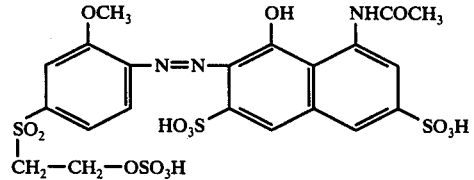 | German Auslegeschrift No. 1.619.513 Example 2, 2nd formula | red |
| 28 | 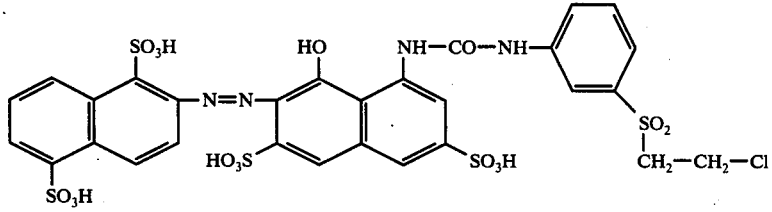 | German Patent No. 1.289.930, Example 19 | red |
| 29 | 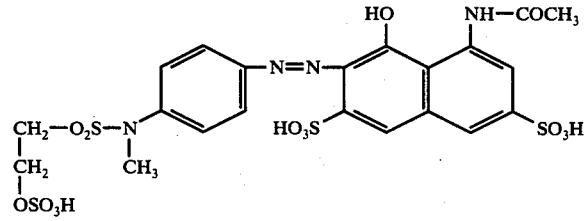 | German Patent No. 1.204.762, Example 38 | red |

Table-continued
| Ex. | Dyestuff | known from | Color shade on cotton |
|---|---|---|---|
| 30 | 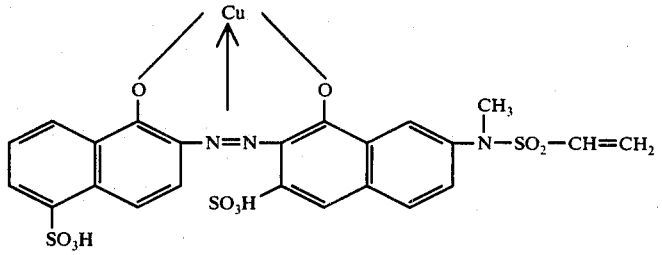 | German Offenlegungsschrift No. 1.939.698 | violet |
| 31 | 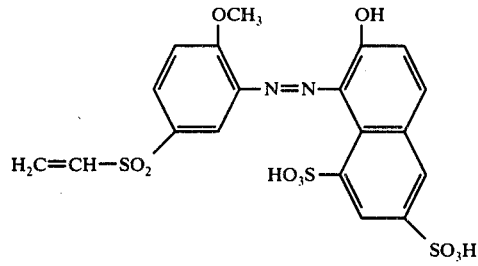 | German Patent No. 960.534, Table Example 8, page 9 | yellow |
| 32 | 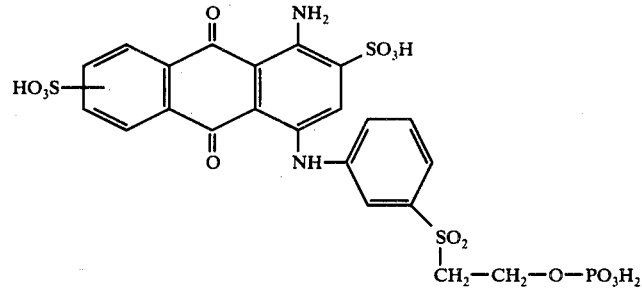 | German Offenlegungsschrift No. 1.793.172, last dyestuff in the Table on page 12 | blue |
| 33 | 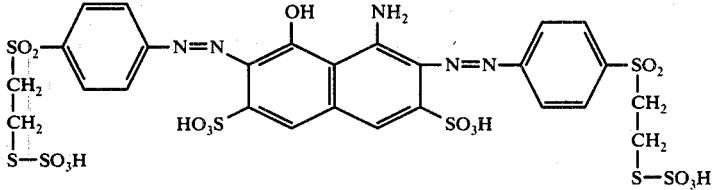 | German Patent No. 1.256.622, columns 7 and 8, Table Example 2 | navy blue |
| 34 | 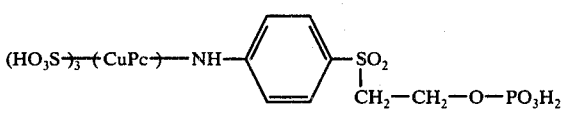 | Austrian Patent No. 287.144, Example 1 | turquoise |
| 35 | 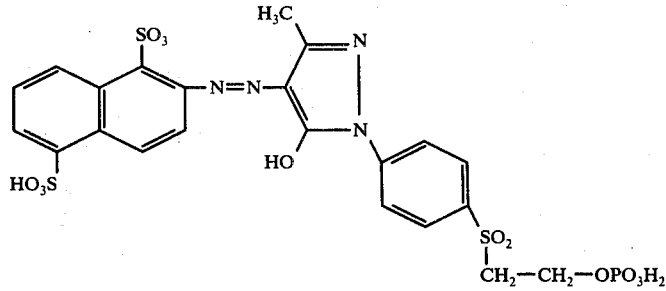 | German Offenlegungsschrift No.1.795.086, Example 3 | yellow |

| Ex. | Dyestuff | known from | Color shade on cotton |
|---|---|---|---|
| 36 | | Austrian Patent No. 278.694, Example 5 | grey |
| 37 | | German Patent No. 1.126.542, Example 2 | navy blue |

We claim:

1. A liquid aqueous dyeing preparation of a reactive dyestuff which contains from 15 to 30% by weight of a dyestuff, which in the form of its free acid corresponds to the formula

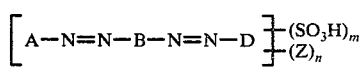

or the formula

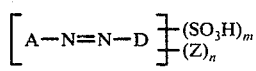

in which A is a benzene or naphthalene nucleus which may contain 1, 2 or 3 substituents selected from the group consisting of fluorine, chlorine, bromine, lower alkyl, lower alkoxy, trifluoromethyl, acetylamino, benzoylamino, chloroacetylamino, methylbenzoylamino, chlorobenzoylamino, carboxy, lower alkylsulfonyl, lower alkylsulfonylamino, phenylsulfonylamino, carbonamide, N-alkyl- and N-phenyl-substituted carbonamide, sulfonamide, N-alkyl- and N-phenyl-substituted sulfonamide, B is a naphthalene nucleus which may be substituted by one or more groups selected from the group consisting of acetylamino, chloro-acetylamino, benzoylamino, carboxy, carbonamide, sulfonamide, lower alkyl-sulfonylamino, phenylsulfonylamino, lower alkylsulfonyl, phenylsulfonyl, hydroxy, amino, lower alkylamino and phenylamino in ortho position to one or to both azo groups, D has the same meaning as B or is a pyrazol-4-yl-radical which is substituted in 3-position by a methyl, carboxy, carbonamide or carboxylic acid alkyl ester group having from 2 to 5 carbon atoms, and which carries in 5-position a hydroxy or an amino group, and which contains in 1-position a bound phenyl radical or naphthyl radical, which may be substituted by 1, 2 or 3 substituents selected from the group consisting of acetylamino, benzoylamino, lower alkyl, lower alkoxy, carboxy, carbonamide, sulfonamide, nitro, chlorine and bromine and in which the sulfo groups and the reactive radical(s) Z stand at the aromatic radicals of A, B or D, m is 2, 3, 4, 5 or 6, and n is 1 or 2, or of the copper, chromium or cobalt complex dyestuffs of a dyestuff which corresponds, in its metal-free form, to one of the above-mentioned formulas, in which A, B and C have the meanings specified above, and wherein the carbocyclic aromatic nuclei of the radicals A, B or D contain the radical of a hydroxy, amino or a carboxy group, to which the metal atom is linked, or of an anthraquinone or trisazo dyestuff or of a copper phthalocyanine dyestuff of the formula

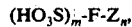

$(HO_3S)_m\text{-}F\text{-}Z_n,$ wherein F is the dyestuff radical of an anthraquinone or a trisazo or a copper phthalocyanine dyestuff, and wherein Z is a fiber-reactive group selected from the group consisting of vinylsulfonyl, β-thiosulfato-ethylsulfonyl, β-phosphatoethylsulfonyl, β-chloro-ethylsulfonyl, β-sulfato-ethylsulfonyl, β-sulfato-ethylsulfonyl-N-(alkyl 1-4 C)-amido and vinylsulfonyl-N- (alkyl 1-4 C)-amido, m is 2, 3, 4, 5 or 6, and n is 1 or 2, and which dyeing preparation contains from 1 to 5% by weight of a buffer substance that does not show any chemical reaction with the reactive group Z, and which is selected from the group consisting of sodium acetate, potassium acetate, sodium oxalate, potassium oxalate, acid sodium and potassium salts of phosphoric acid and secondary and tertiary sodium and potassium salts of phosphoric acid and sodium borate, and has a pH value in the range of from 3 to 7.

2. A dyeing preparation as claimed in claim 1, which contains as dyestuff a dyestuff of the formula

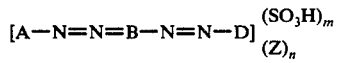

$[A-N=N-B-N=N-D] \begin{matrix}(SO_3H)_m\\(Z)_n\end{matrix}$ or of the formula

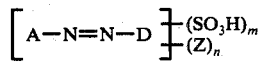

$\left[A-N=N-D\right] \begin{matrix}(SO_3H)_m\\(Z)_n\end{matrix}$ in which A is a benzene nucleus which may be substituted by 1 or 2 substituents selected from the group consisting of chlorine, bromine, lower alkyl, lower alkoxy, acetylamino, carboxy, sulfonamide, or is a naphthalene nucleus which may be substituted by acetylamino, carboxy, sulfonamide, carbonamide or chloroacetylamino, B is a naphthalene nucleus which may be substituted by one or more groups selected from the group consisting of acetylamino, chloroacetylamino, carboxy, carbonamide, sulfonamide, hydroxy, amino, lower alkylamino and phenylamino standing in ortho position to one or to both azo groups, D has the same meaning as A or B or represents a pyrazole-4-yl radical which is substituted in 3-position by a methyl, carboxy, carbonamide or carboxylic acid alkyl ester group having 2 or 3 carbon atoms, and which carries in 5-position a hydroxy or amino group and contains in 1-position a bound phenyl radical or naphthyl radical which may be substituted by 1, 2 or 3 substituents selected from the group consisting of acetylamino, lower alkyl, lower alkoxy, carboxy, carbonamide, sulfonamide, nitro, chlorine and bromine, and in which the sulfo groups and the reactive radical(s) Z stand at the aromatic radicals of A, B or D, m is 2, 3, 4, 5 or 6, and n is 1 or 2, Z as well as m and n having the meanings specified in claim 1, or which contain the Cu-, Cr- and Co-complex compounds thereof which correspond, in their metal-free form, to the above-specified formulas with A, B, D, Z, m and n having the meanings mentioned in this claim, the carboxylic aromatic nuclei of the radicals of A, B or D containing the radical of a hydroxy, amino or carboxy group, to which the metal atom is linked.

3. Dyeing preparations as claimed in claim 1, which contain sodium borate.

4. Dyeing preparations as claimed in claim 1, which contain disodiumhydrogenophosphate and/or sodiumdihydrogenophosphate.

5. Dyeing preparations as claimed in claim 1, wherein Z is β-sulfato-ethylsulfonyl.

6. A dyeing preparation as claimed in claim 1, which contains a dyestuff of the formula

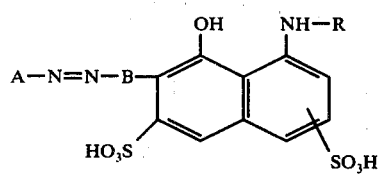

wherein R is an alkanoyl radical having from 2 to 4 carbon atoms.

7. A dyeing preparation as claimed in claim 1, which contains a dyestuff of the formula

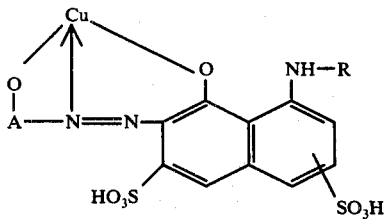

wherein R is an alkanoyl radical having from 2 to 4 carbon atoms.

* * * * *